United States Patent [19]

Marzocchi

[11] 3,900,679

[45] Aug. 19, 1975

[54] GLASS FIBER REINFORCED ELASTOMERS

[75] Inventor: Alfred Marzocchi, Cumberland, R.I.

[73] Assignee: Owens-Corning Fiberglas Corporation, Toledo, Ohio

[22] Filed: July 23, 1973

[21] Appl. No.: 381,456

Related U.S. Application Data

[63] Continuation-in-part of Ser. No. 154,098, June 17, 1971, abandoned.

[52] U.S. Cl. ............... 428/378; 428/365; 428/390; 428/273; 260/80.71; 260/448.2 N; 260/448.8 R; 260/827; 260/5; 260/42.15; 57/140 C
[51] Int. Cl. ..................... C08f 15/40; C03c 25/02
[58] Field of Search ............... 117/126 GS, 126 GN, 117/126 GB, 72; 260/827, 448.2 N, 260/448.8 R, 80.71

[56] References Cited
UNITED STATES PATENTS

| | | | |
|---|---|---|---|
| 2,742,378 | 4/1956 | Te Grotenhuis | 260/827 |
| 2,762,717 | 9/1956 | Clark | 260/448.8 R |
| 2,823,218 | 2/1958 | Speier | 260/448.2 N |
| 3,249,461 | 5/1966 | Te Grotenhuis | 117/126 GS |
| 3,252,825 | 5/1966 | Marzocchi | 260/827 |
| 3,424,608 | 1/1969 | Marzocchi | 117/126 GB |
| 3,437,550 | 4/1969 | Paul | 161/93 |
| 3,484,333 | 12/1969 | Vanderbilt | 117/126 GB |
| 3,584,026 | 6/1971 | Berger | 260/448.8 R |
| 3,650,810 | 3/1972 | Marzocchi | 117/126 GS |
| 3,759,968 | 9/1973 | Berger | 260/448.8 R |

*Primary Examiner*—Ralph Husack
*Assistant Examiner*—William H. Schmidt
*Attorney, Agent, or Firm*—Carl G. Staelin; John W. Overman; Keith V. Rockey

[57] ABSTRACT

The improvement in the bonding relationship between glass fibers and elastomeric materials in the manufacture of glass fiber-reinforced elastomeric products wherein individual glass fibers are impregnated with a composition containing a terpolymer formed by the interpolymerization of butadiene, styrene and a monomeric material which can be an amino silane containing ethylenic unsaturation or an amide formed by the reaction of an amino silane with polymerizable mono- and dicarboxylic acids.

15 Claims, No Drawings

GLASS FIBER REINFORCED ELASTOMERS

This is a continuation-in-part of copending application Ser. No. 154,098, filed June 17, 1971, now abandoned.

This invention relates to elastomeric products reinforced or otherwise combined with glass fibers and it relates more particularly to the method and compositions employed in the treatment of the glass fibers to enhance the bonding relationship between the glass fibers and the elastomeric material for making fuller utilization of the desirable characteristics of the glass fibers in their combination with the elastomeric materials.

The term "glass fibers," as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto multiple streams of molten glass issuing from the bottom side of a glass melting bushing and to yarns that are formed when such discontinuous fibers are allowed to rain down gravitationally onto foraminous surfaces wherein the fibers are gathered together to form a sliver which is drafted into a yarn; and to woven and non-woven fabrics formed of such yarns of discontinuous fibers, and (3) combinations of continuous and discontinuous fibers in strands, yarns, cords and fabrics formed thereof.

As used herein, the term "elastomer" is meant to include natural rubber in the cured or uncured stage, vulcanized or unvulcanized stage, and synthetic organic elastomeric materials such as butadiene-styrene copolymer, butadiene-acrylonitrile copolymer, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3 to 20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2-12 carbon atoms.

The invention is addressed to the fuller utilization of the desirable characteristics of glass fibers, such as their high strength, flexibility, thermal stability, chemical stability, inertness, electrical resistance and heat conductive characteristics when used in combination with elastomeric materials as a reinforcement or as a stabilizing agent in belt manufacture, as reinforcing cords and fabrics to increase strength, life, wearability and service characteristics in rubber tires, and as a reinforcement and the like in other elastomeric coated fabrics and in molded elastomeric products.

It is an object of this invention to provide a new and improved composition which may be used as a forming size for treatment of glass fibers in forming or preferably as an impregnating composition for treatment, in forming or afterwards, of bundles, yarns, cords, strands and fabrics formed of glass fibers to enable fuller utilization to be made of the desirable characteristics of the glass fibers when used in combination with elastomeric materials in the manufacture of glass fiber reinforced molded products and coated fabrics.

More specifically, it is an object of this invention to provide a composition for use in the treatment of glass fibers in forming to improve the processing and the performance characteristics of the glass fibers as a reinforcement for elastomeric materials and for use in the treatment of bundles, strands, yarns, cords and fabrics of glass fibers, in forming or afterwards, to enhance their bonding relationship when used in combination with elastomeric materials in the manufacture of glass fiber reinforced plastics, laminates or coated fabrics, and it is a related object to provide a method and means for making fuller utilization of the strength properties of glass fibers when used as a reinforcement for elastomeric materials.

Until recently, glass fibers which have been added or otherwise incorporated with elastomeric materials, in the form of continuous or chopped fibers, have functioned more or less as a filler than as a reinforcement, or flexibilizing agent, or stabilizing agent. As a result, little, if any, improvements in mechanical and physical properties have been made available from the combinations which made use of glass fibers in products formed of elastomeric materials. It is believed that the failure to make fuller utilization of some of the more desirable properties of the glass fiber components resides in the inability properly to integrate the glass fibers with the elastomeric system.

Investigations have been conducted over the past several years by the most highly skilled in the art in an attempt to make fuller utilization of the glass fiber components formulated into elastomeric materials in the endeavor to fabricate products having new and improved physical and mechanical properties. Substantial inroads are now being made as represented by the practice of this invention, as will hereinafter be described.

The invention will be described with reference to a new and improved composition which can be employed as an original size applied to the glass fibers in forming thereby individually to coat each of the glass fiber filaments subsequently formed into the strand, yarn cord or fabric to provide both the desired processing and performance characteristics for processing the sized glass fibers in the formation of the strand and in the twisting and plying of the strands into yarns or cords and in the processing of the strands, yarns or cords into fabrics and the desired performance characteristics for enhancing the bonded relationship when the sized glass fibers are combined with elastomeric materials in the manufacture of reinforced elastomeric products.

In the preferred practice of this invention, the composition is formulated as an impregnating composition for treatment of strands, yarns, cords and fabrics formed of previously sized glass fibers for penetration of the treating composition into the strand, yarn, cord or fabric with the intention of individually coating the fibers to protect the fibers against destruction by mutual abrasion while establishing a bonded relationship therewith or else penetrating the glass fiber strand, yarn, cord or fabric sufficiently to intertie the glass fiber system with the elastomeric materials with which the glass fibers are combined in the manufacture of glass fiber-elastomeric products.

The following examples will serve to illustrate the principal concepts of this invention in a composition and method for treatment, as by impregnation, of yarns, cords, strands and fabrics of glass fibers hereinafter referred to as bundles, wherein the individual glass fibers have preferably, although not necessarily, been sized in forming with a conventional size composition which has preferably been modified to embody a glass fiber anchoring agent.

EXAMPLE 1

Forming Size Composition 8.0% by weight partially dextrinized starch
1.8% by weight hydrogenated vegetable oil
0.4% by weight cationic wetting agent (lauryl amine acetate)
0.2% by weight nonionic emulsifying agent
1.0% by weight gamma-aminopropyltriethoxysilane
88.6% by weight water

EXAMPLE 2

Forming Size Composition 3.2% by weight saturated polyester resin
0.1% by weight fatty acid amine wetting agent (Nopcogen 16 L)
0.1% by weight polyvinyl alcohol
3.0% by weight pyrrolidine
0.3% by weight gamma-aminopropyltriethoxysilane
0.1% by weight glacial acetic acid
93.2% by weight water

EXAMPLE 3

Forming Size Composition 0.2% by weight paraffin wax in aqueous emulsion
1.3% by weight cationic amide polyester resin
2.3% by weight polyglycol condensate (300–400 m.w.)
0.25% by weight gelatin
0.5% by weight gamma-aminopropyltriethoxysilane
0.1% by weight dibasic ammonium phosphate
0.2% by weight glacial acetic acid
95.15% by weight water

EXAMPLE 4

Forming Size Composition 0.5% by weight gamma-aminopropyltriethoxysilane
0.25% by weight fatty acid amine wetting agent (Nopcogen 16 L)
99.25% by weight water

EXAMPLE 5

This example illustrates the preparation of a terpolymer formed of beta-aminovinyltrimethoxysilane, butadiene and styrene.

In the preparation of the terpolymer a reaction mixture is formulated to include:

72 parts by weight Butadiene
28 parts by weight Styrene
180 parts by weight Water
4.5 parts by weight Soap
0.4 parts by weight Dodecyl mercaptan
0.3 parts by weight Potassium sulfide
6.0 parts by weight Beta-aminovinyltrimethoxysilane
5.0 parts by weight Tetramethyl ammonium hydroxide Thereafter, a free radical catalyst (benzoyl peroxide) is added, the mixture is vigorously agitated to disperse the organic components and heated to a temperature of about 120°C for a period of about 8 hours.

The resulting terpolymer is separated from the reaction mixture, and is found to contain about 5% by weight of the beta-aminovinyltrimethoxy silane.

EXAMPLE 6

An impregnating composition formed of the terpolymer prepared in Example 5 is prepared by first formulating the terpolymer into a latex and dispersing the latex in aqueous media as follows:

| | |
|---|---|
| Beta-aminovinyltrimethoxy silane-butadiene-styrene terpolymer latex (50% solids) | 30.0% |
| Water | 70.0% |

Impregnation with the aqueous composition of Example 4 can be made by conventional means for impregnation, such as by immersion of the bundles of glass fibers in a bath of aqueous impregnating composition.

The beta-aminovinyltrimethoxy silane-butadiene-styrene terpolymer is formed by the reaction of an amino-substituted organo silane with butadiene and styrene in the presence of a free radical catalyst, such as organic peroxide, as illustrated by the procedure set forth in Example 5. In carrying out the polymerization reaction, use can be made of conventional emulsifiers and catalysts of the type usually employed in the production of butadiene-styrene copolymers.

The reaction is carried out at an alkaline pH, and preferably a pH of 10 or higher, in order to maintain the silane in solution during the reaction. For this purpose, the reaction is preferably carried out in the presence of a base and preferably a quaternary ammonium hydroxide, as represented by tetraalkyl ammonium hydroxides in which the alkyl groups contain 1–20 carbon atoms (and preferably those in which the total number of carbon atoms is less than 24) and tetraalkanolyl ammonium hydroxides in which the alkanolyl groups contain 1–10 carbon atoms. Illustrative of the foregoing include tetramethyl ammonium hydroxide, tetraethyl ammonium hydroxide, trimethylstearyl ammonium hydroxide, tetraethanol ammonium hydroxide, etc.

Alternatively, the reaction can be carried out in the presence of ammonia by the use of gaseous ammonia under a pressure sufficient to provide the desired pH. Thus, when the reaction is completed, the ammonia pressure can be released to thereby volatilize most of the ammonia present.

In formulating impregnating compositions of the type described in Example 6, it is frequently advantageous to include a quaternary compound of the type described above to insure that the terpolymer will remain dispersed in the composition. For this purpose, use can be made of from 0.1 to 20 parts of quaternary compound per part of terpolymer.

It will be understood by those skilled in the art that a wide variety of amino-substituted organo silanes can be employed in lieu of the beta-aminovinyltrimethoxysilane exemplified in Example 5. In general, amino silanes included within the scope of the invention are those silanes which contain at least one amino group in an organic group attached to the silicon atom containing ethylenic unsaturation. The ethylenic unsaturation may, although not necessarily, be in the organic group attached to the silicon atom on which the amino group is substituted.

The preferred amino silanes, containing an organic group attached to the silicon atom having ethylenic unsaturation, are those having the general formula:

$$R_n Si Z_{(4-n)}$$

wherein Z is hydrogen or a readily hydrolyzable group, such as halogen (e.g., chlorine, bromine, fluorine and iodine) or alkoxy having 1–8 carbon atoms, including methoxy, ethoxy, propoxy, butoxy, etc.; n is an integer from 1 to 3; and R is hydrogen, an alkyl group containing 1–10 carbon atoms or an amino-substituted alkenylene group having 2–8 carbon atoms, such as the beta-aminovinyl and gamma-aminoallyl groups, and in which at least one R group is the amino-substituted unsaturated group.

Representative of the foregoing compounds include beta-aminovinyltriethoxy silane, beta-aminovinyldimethoxy silane, beta-aminovinyltrichlorosilane, gamma-aminoallyltrimethoxy silane, gamma-aminoallyltrichlorosilane, beta-aminovinyldimethoxysilane, bis-(beta-aminovinyl)dimethoxy silane, tris-(beta-aminovinyl)silane as well as a variety of others.

Another group of silanes useful in accordance with the preparation of the terpolymers of this concept of the invention are those having the general

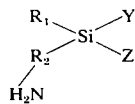

wherein $R_1$ is an alkenyl group having 2–6 carbon atoms, such as vinyl, allyl, 3-butenyl, etc., and amino-substituted derivatives thereof. $R_2$ is a divalent organic group, such as alkylene having 1–6 carbon atoms, including methylene, ethylene, trimethylene, tetramethylene, etc.; arylene, such as phenylene or naphthylene; cyclohexylene, etc.; Z is as indicated above and Y is either $R_1$, $R_2$ or Z.

Representative of the foregoing compounds are gamma-aminopropylvinyldimethoxysilane, delta-aminobutylvinyltrichlorosilane, p-aminophenylallyldiethoxy silane, 3-aminocyclohexylethylvinyldimethoxy silane, bis-(gamma-aminopropyl)vinylethoxy silane as well as others.

The foregoing polyfunctional silanes can be prepared using well-known techniques of silane chemistry. One simple way of preparing such compounds may be illustrated by way of the following equations:

CH$_2$=CH—Si—H—Cl$_2$ +
NH$_2$—CH$_2$—CH=CH$_2$ $\xrightarrow{\text{Pt catalyst}}$

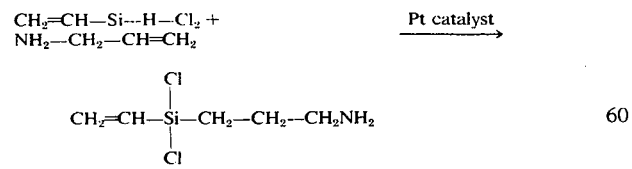

This reaction is illustrated by U.S. Pat. No. 2,823,218. The product can be converted to the corresponding alkoxy derivative by reaction with an alkanol (e.g. methanol) in the presence of an HCl acceptor as follows:

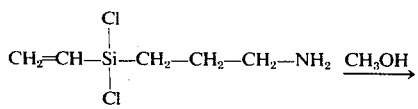

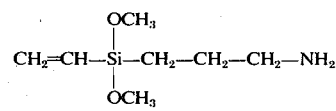

Another related reaction is illustrated by the following equations:

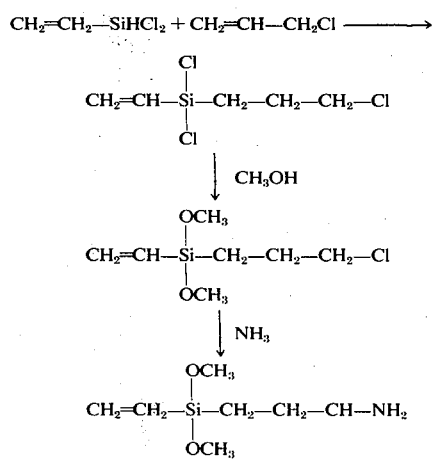

The foregoing reaction is analogous to that employed in the manufacture of the well-known compound gamma-aminopropyltriethoxy silane.

Another route to the compounds employed in the practice of this invention may be illustrated by the following:

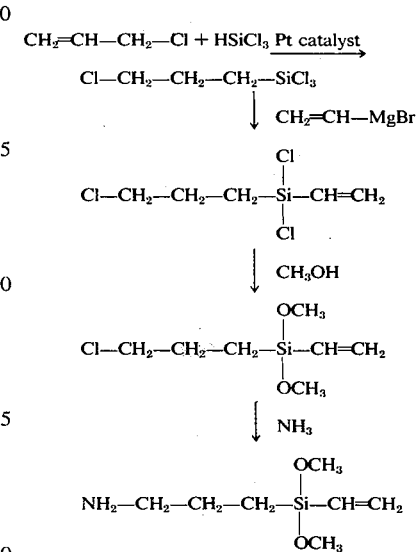

As will be appreciated by those skilled in the art, other compounds described can be prepareed by analogous reactions as follows:

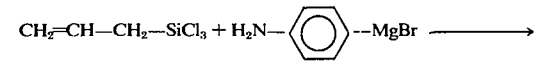

-Continued

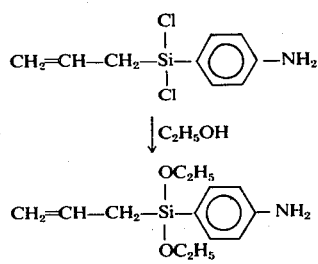

The foregoing organo silicon compounds are preferably employed in the practice of the present invention in the form of the silane discussed above. However, it will be understood by those skilled in the art that use can also be made of the foregoing organo silicon compounds in the form of the corresponding silanol or polysiloxane.

Additional examples of this concept of the invention may be illustrated by the following:

EXAMPLE 7

This example illustrates the use of gamma-aminopropylvinyl dimethoxy silane as a terpolymer component.

Gamma-aminopropylvinyldimethoxy silane is first prepared by reacting vinyldichlorosilane with allyl chloride in equal molar amounts in pentane as a solvent. The catalyst employed is chloroplatinic acid in an amount as taught by U.S. Pat. No. 2,823,218. The reaction is carried out by refluxing the reaction mixture for about 6 hours.

Thereafter, the product of the reaction, gamma-chloropropylvinyldichlorosilane is separated from the reaction mixture and contacted with excess methanol. Ammonia is then passed through the product dissolved in pentane for about 6 hours. The desired product is separated from the reaction mixture.

Seven parts by weight of gamma-aminopropylvinyl-dimethoxy silane are substituted for the beta-aminovinyltrimethoxy silane in the polymerization recipe used in Example 5 without the quaternary compound.

The reaction mixture is heated to a temperature of 130°C for a period of 7 hours under an ammonia pressure sufficient to provide a pH of 11, after which the resulting terpolymer is separated, washed and found to contain 3.8% of the silane. The terpolymer is then formulated into the following impregnating composition:

| | |
|---|---|
| Gamma-aminopropylvinyldimethoxysilane-butadiene-styrene terpolymer (25% solids) | 30.0% |
| Water | 70.0% |

Application of this impregnating composition can be made in the manner described in Example 6 in an amount sufficient to deposit dry solids constituting between 5–25% by weight of the glass fiber system.

EXAMPLE 8

This example illustrates the use of a polysiloxane in the preparation of a terpolymer in accordance with the present invention.

Ten parts by weight of a polysiloxane formed of beta-aminovinyltriethoxysilane having an average molecular weight of 425 is used in the polymerization recipe described in Example 5. The polymerization reaction is carried out at 128°C for a period of 10 hours, and the resulting polymer is found to contain 7% by weight of the polysiloxane.

An impregnating composition can be formulated of the terpolymer as follows:

| | |
|---|---|
| Polysiloxane-butadiene-styrene terpolymer (20% solids) | 27.0% |
| Water | 73.0% |

In accordance with the practice of this concept of the invention, the amount of silane incorporated into the terpolymer can be varied within wide ranges. For best results, the silane (or silanol or siloxane) should form between 0.1 and 40% by weight of the terpolymer, and preferably 1–10% by weight. The ratio of butadiene to styrene is preferably such that butadiene forms 60–80% by weight of the terpolymer, and the styrene forms from 5–40% by weight.

Impregnant compositions formed of the terpolymer are preferably dispersions of the terpolymer in aqueous medium having a solids content within the range of 10–50% solids by weight.

In accordance with another concept of the invention, an amino-silane can be formed into a terpolymer with butadiene and styrene by first reacting the amino silane with a polymerizable monocarboxylic acid, as illustrated by the following:

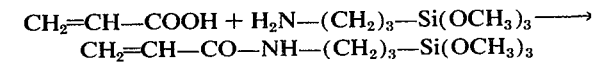

$$CH_2{=}CH{-}CO{-}NH{-}(CH_2)_3{-}Si(OCH_3)_3$$

Then, the corresponding silyl amide can be polymerized with butadiene and styrene to form a silyl amide containing terpolymer. This concept may be illustrated by the following example:

EXAMPLE 9

Equal molar quantities of acrylic acid and gamma-aminopropyltrimethoxy silane are reacted at a temperature of 45°C to form the corresponding silyl amide.

Twelve parts by weight of the silyl amide are formulated into the following emulsion polymerization recipe:

72 parts by weight Butadiene
28 parts by weight Styrene
180 parts by weight Water
4.5 parts by weight Soap
0.4 parts by weight Dodecyl mercaptan
0.3 parts by weight Potassium sulfide
12.0 parts by weight N-trimethoxysilylpropylacrylamide
15.0 parts by weight Tetramethanol ammonium hydroxide Thereafter, a benzoyl peroxide free radical catalyst is added, and the reaction is carried out for 7 hours at 122°C. The resulting terpolymer is separated from the reaction mixture and is found to contain about 10% by weight of the N-trimethoxysilylpropylacrylamide.

EXAMPLE 10

The terpolymer prepared in Example 9 is formulated into the following impregnating composition:

| | |
|---|---|
| N-trimethoxysilylpropylacrylamide-butadiene-styrene terpolymer (55% solids) | 30.0% |
| Tetramethyl ammonium hydroxide | 5.0% |
| Water | 65.0 |

It will be understood by those skilled in the art that a wide variety of amino silanes may be used in lieu of the gamma-aminopropyltrimethoxy silane exemplified. In general, suitable organo silicon compounds useful in accordance with this concept of the present invention include organo silicon having 1–3 organic groups attached directly to the silicon atoms, with at least one of the organic groups being substituted by an amino group, with the remaining valence on the silicon atom being taken up by one or more groups including hydrogen or readily hydrolyzable groups, as well as the silanols and polysiloxanes formed from these silanes.

Particular preferred amino silanes include those silanes having the general formula:

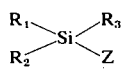

wherein Z is hydrogen or a readily hydrolyzable group as described above; $R_1$ is an organic group containing at least one amino group and $R_2$ and $R_3$ are each selected from $R_1$, Z, alkyl having 1–6 carbon atoms, such as methyl, ethyl, propyl, etc.; aryl, such as phenyl, alkenyl having 2–6 carbon atoms, including vinyl, allyl, etc.

Representative of the $R_1$ groups containing at least one amno group include aminoalkyl wherein the alkyl group contains 1–10 carbon atoms, such as aminoethyl, aminopropyl, aminobutyl, etc.; aminoalkylene wherein the alkenylene group contains 2–8 carbon atoms, such as aminovinyl, aminoallyl, etc.; aminoaryl, such as aminophenyl, aminonaphthyl; aminocycloalkyl wherein the cycloalkyl group contains 5–8 carbon atoms, such as aminocyclopentyl, aminocyclohexyl, etc.; and polyalkylene polyamine as represented by the following:

$H_2N - R_4 - NH - R_5 -$
$H_2N - R_6 - NH - R_7 - NH - R_7 -$
or
$H_2N - R_8 - NH - R_9 - NH - R_{10} - NH - R_{11} -$ wherein $R_4$, $R_5$, $R_6$, $R_7$, $R_8$, $R_9$, $R_{10}$ and $R_{11}$ are each alkylene having 1–4 carbon atoms, such as methylene, ethylene, trimethylene or tetramethylene.

Similarly, a wide variety of polymerizable monocarboxylic acids may be used in lieu of the acrylic acid exemplified. In general, suitable acids are those polymerizable aliphatic and aromatic monocarboxylic acids having 3–20 carbon atoms and containing ethylenic unsaturation.

Particularly preferred acids for use in accordance with this concept of the invention are those polymerizable acids having the general formula

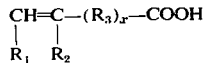

wherein $R_1$ and $R_2$ are each selected from the groups consisting of hydrogen and lower alkyl, such as methyl, ethyl, propyl, etc.; x is an integer between 0 and 1; and $R_3$ is a divalent organic group including alkylene having 1–8 carbon atoms, such as methylene, trimethylene, tetramethylene, etc.; or, arylene, such as phenylene and naphthylene.

Representative acids having the above general formula include acrylic acid, methacrylic acid, crotonic acid, 3-butenoic acid, 3-vinylbenzoic acid as well as a wide variety of others.

Additional examples of this concept of the invention can be illustrated by the following:

EXAMPLE 11

A silylamide is prepared by reacting methacrylic acid with N-(beta-aminoethyl)-gamma-aminopropyltriethoxy silane in the same manner described in Example 9. The resulting amide has the structural formula:

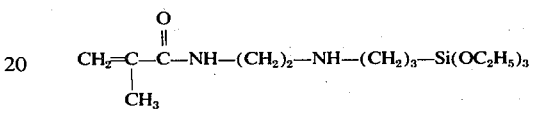

Fifteen parts by weight of the above amide are substituted for the acrylamide in the polymerization recipe of Example 9. The polymerization is carried out at 122°C for a period of 12 hours, and the resulting terpolymer is found to contain about 10% by weight of the methacrylamide.

This terpolymer can be formulated into the following impregnating composition:

| | |
|---|---|
| Methacrylamide-butadiene-styrene terpolymer (20% solids) | 31.0% by weight |
| Water | 69.0% by weight |

EXAMPLE 12

This example illustrates the use of a polysiloxane in preparing a terpolymer according to this concept of the invention.

In this example, 440 grams of a polysiloxane polymer of gamma-aminopropyltriethoxy silane having an average molecular weight of 440 is reacted with 190 g. of acrylic acid at a temperature of 50°C. The resulting amide is then formulated into the polymerization recipe of Example 9, and the polymerization reaction is carried out at 125°C for 8 hours.

The resulting terpolymer is found to contain 15% by weight of the amide, and can be formulated into the following impregnating composition:

| | |
|---|---|
| Terpolymer (25% solids) | 25.0% by weight |
| Water | 75.0% by weight |

In accordance with this concept of the invention, the amount of the silyl amide present in the terpolymer can be varied within wide ranges. For best results, the terpolymer should contain 60–80% by weight butadiene, 5–40% by weight styrene and 1–40% by weight of the amide.

While polymerizable monocarboxylic acids are preferred for use in forming the polymerizable silyl amide in accordance with this concept of the invention, use can also be made of polymerizable dicarboxylic acids in accordance with the following equation:

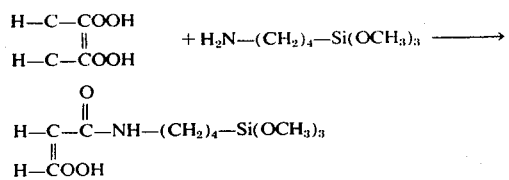

The resulting monoamide can be polymerized with butadiene and styrene in the manner described to form the corresponding terpolymer. The use of dicarboxylic acids may be illustrated by the following examples.

EXAMPLE 13

One mole of delta-aminobutyltriethoxysilane is reacted with 1 mole of maleic acid at 45°C to form the corresponding monoamide.

Twelve parts by weight of the monoamide are then formulated into the polymerization recipe used in Examples 5 and 9, and the reaction is carried out at 124°C for a period of 7 hours.

The resulting terpolymer is separated from the reaction mixture and formulated into the following composition:

| | |
|---|---|
| Monomamide-butadiene-styrene terpolymer (50% solids) | 28.0% by wt. |
| Water | 72.0% by wt. |

Various other polymerizable dicarboxylic acids may be used in lieu of the maleic acid exemplified. Preferred are the aliphatic dicarboxylic acids containing 4–12 carbon atoms and at least one carbon-to-carbon double bond, as well as their corresponding acid halides, and particularly acid chlorides and anhydrides. Representative of the foregoing compounds are maleic acid, maleic anhydride, fumaric acid and glutaconic acid, as well as many others.

In formulating the terpolymer with butadiene and styrene, the monoamide is preferably used in an amount having the same composition as the terpolymers formed of the amide of a monocarboxylic acid, butadiene and styrene.

Additional examples of this concept of the invention are illustrated as follows:

EXAMPLE 14

A polymerizable silyl monoamide is prepared by reacting one mole of glutaconic acid with one mole of p-aminophenyltrimethoxysilane at 50°C to form the corresponding monoamide.

The resulting monoamide is then polymerized with butadiene and styrene to form a terpolymer containing 7% by weight of the monoamide.

The terpolymer can be formulated into the following impregnating composition:

| | |
|---|---|
| Monoamide-butadiene-styrene terpolymer (48% solids) | 32.0% by wt. |
| Water | 68.0% by wt. |

EXAMPLE 15

This example illustrates the use of the polysiloxane of gamma-aminopropyltriethoxy silane employed in Example 12 in preparing a polymerizable monoamide.

One mole of maleic anhydride is reacted with 440 grams of the polysiloxane at 55°C. The resulting monoamide is formulated into the polymerization recipe described in Example 9, and the polymerization reaction is conducted at 120°C for 8 hours.

The resulting terpolymer can be formulated into the following impregnating composition:

| | |
|---|---|
| Terpolymer (53% solids) | 27.5% by wt. |
| Water | 62.5% by wt. |

While this concept of the invention has been described above with reference to the use of a monoamide of a dicarboxylic acid as the polysiloxane monomer for interpolymerization with butadiene and styrene, it will be understood by those skilled in the art that the corresponding diamide may also be used in accordance with this concept of the invention, either alone or in combination with monoamide of the polysiloxane dicarboxylic acid. However, it is generally preferred to make use of the monoamide as well as those compounds having generally a higher polymerization rate than the corresponding diamide. Thus, when reacting the amino silane with the dicarboxylic acid, it is preferred to utilize approximately stoichiometric quantities of the reactants.

While the invention has been described above with reference to the use of the terpolymers of the present invention as the sole impregnant, use can also be made of impregnating compositions embodying the terpolymers of the invention in combination with other elastomer compatible materials. For example, use can be made of resorcinol-aldehyde latices as represented by the following examples.

EXAMPLE 16

| | |
|---|---|
| Natural rubber latex-resorcinol-formaldehyde resin (38% solids - "Lotol") | 2–10 parts by wt. |
| Silyl containing terpolymer | 15–50 parts by wt. |

Water is incorporated with the foregoing materials to provide an impregnating composition having a solids content within the range of 10–15% solids by weight. Application should be made in an amount to deposit dry solids in the glass fiber bundle constituting between 5–25% by weight of the glass fiber system.

Suitable resorcinol-aldehyde resins and combinations thereof with natural rubber latex are marketed by the U.S. Rubber Company under the tradename "Lotol." For the preparation of such materials, reference can be made to Canadian Pat. No. 435,754 wherein description is made of the reaction of resorcinol and formaldehyde in the presence of a substantial amount of short-chained alkylamines for the purpose of stabilizing the reaction and the products formed therefrom, as well as a description of the combination of the formed resin with rubber latex.

EXAMPLE 17

| | |
|---|---|
| Natural rubber latex-resorcinol-formaldehyde resin (38% solids "Lotol") | 7.0 parts by wt. |
| Beta-aminovinylmethyldimethoxy-silane-butadiene-styrene terpolymer | 23.0 parts by wt. |
| Water | 70.0 parts by wt. |

EXAMPLE 18

| | |
|---|---|
| Natural rubber latex-resorcinol-formaldehyde resin (38% solids "Lotol") | 5.0 parts by wt. |
| Terpolymer of Example 9 | 25.0 parts by wt. |
| Tetramethyl ammonium hydroxide | 3.0 parts by wt. |
| Water | 70.0 parts by wt. |

EXAMPLE 19

| | |
|---|---|
| Natural rubber latex-resorcinol-formaldehyde resin (38% solids - "Lotol") | 8.0 parts by wt. |
| Terpolymer of Example 13 | 25.0 parts by wt. |
| Water | 70.0 parts by wt. |

Instead of resorcinol-aldehyde latices, use can be made of vinyl pyridine-butadiene-styrene terpolymers in combination with the terpolymers of the present invention, as represented by the following examples:

EXAMPLE 20

| | | |
|---|---|---|
| Silyl-containing terpolymer | 15–50 | parts by wt. |
| Vinyl pyridine-butadiene-styrene terpolymer (42% solids "Gentac") | 2–10 | parts by wt. |

Water is incorporated with the foregoing materials to provide an impregnating composition having a solids content within the range of 10–50% by weight.

The vinyl pyridine terpolymer is a terpolymer of about 15 parts by weight vinyl pyridine, 70 parts by weight butadiene and 15 parts by weight styrene. Suitable vinyl pyridine terpolymers are described in U.S. Pat. No. 3,424,608 and are commercially available under the tradename "Gentac" from the General Tire and Rubber Company.

EXAMPLE 21

| | |
|---|---|
| Beta-aminovinyltriethoxy silane-butadiene-styrene terpolymer | 25.0 parts by wt. |
| Vinyl pyridine-butadiene-styrene terpolymer | 30.0 parts by wt. |
| Tetraethanol ammonium hydroxide | 3.0 parts by wt. |
| Water | 80.0 parts by wt. |

In addition to the foregoing, the terpolymers of the present invention can be used in place of or in addition to the vinyl pyridine-butadiene-styrene terpolymer in the impregnating composition described in U.S. Pat. No. 3,424,608, as represented by the following examples:

EXAMPLE 22

| | | |
|---|---|---|
| Resorcinol-formaldehyde resin | 2–10 | pts. by wt. |
| Formaldehyde (37% solution) | 1–3 | pts. by wt. |
| Concentrated ammonium hydroxide | 2–5 | pts. by wt. |
| Vinyl pyridine-butadiene-styrene terpolymer | 15–50 | pts. by wt. |
| Neoprene rubber latex (50% solids) | 25–50 | pts. by wt. |
| Butadiene latex (60% solids) | 5–15 | pts. by wt. |
| Alkali metal hydroxide | .05–0.2 | pts. by wt. |

Water is incorporated with the foregoing materials in amounts to produce an impregnating composition having a minimum solids content of 10% and a maximum solids content of about 50% by weight. Introduction should be made in an amount to impregnate with a dry solids of 5–25% by weight of the glass fiber system and preferably 10–15% by weight.

It is desirable to achieve as full impregnation as possible into the bundles of glass fibers in order to more effectively separate the fibers one from the other by the impregnating materials since the solids are effective as a coating on the sized glass fibers to cushion the fibers and to protect the fibers against mutual abrasion. Thus, it is desirable to achieve as deep a penetration as possible with the impregnating composition into the glass fiber bundle. The deeper the penetration, the more effective will be the bond between the glass fibers in the bundle and the elastomeric material with which the bundles of glass fibers are combined in the subsequent manufacture of the glass fiber-elastomeric product.

In the final system, the elastomeric material with which the glass fibers are combined will constitute a continuous phase. Such continuous phase of elastomeric material may comprise rubbers of the type incorporated into the impregnating composition or the elastomeric material can differ therefrom. The continuous phase of elastomeric material can be employed in the cured or uncured state or in the vulcanized or unvulcanized state. It is believed that the tie-in between the impregnated bundles of glass fibers and the elastomeric material forming the continuous phase will occur primarily during cure or vulcanization of the elastomeric material during the fabrication of the elastomeric material.

More complete protection for the individual glass fibers and a fuller coordination with the elastomeric material in the continuous phase can be achieved when the impregnating composition of Examples 5 to 23 are modified for treatment of the glass fibers as a size composition which can be applied to the individual glass fibers as they are formed, or afterwards when original size is removed. For this purpose, the impregnating composition of this invention should be formulated to include an anchoring agent, such as gamma-aminopropyltriethoxy silane. Instead of gamma-aminopropyltriethoxy silane, in the size or in the impregnating composition, use can be made of other organo silicon compounds in which the organic group attached to the silicon atom contains an amino group, such as gamma-aminovinyldiethoxysilane, gamma(triethoxysilylpropylamide)propylamine, N(gamma-triethoxysilylpropyl)propylamine, beta-aminoallyltriethoxy silane, and para-aminophenyltriethoxy silane. Use can be made of other organo silicon compounds in the form of a silane, silanol or polysiloxane in which the organic group attached to the silicon atom contains an epoxy group, such as glycydoxypropyltrimethoxy silane or 3,4-epoxycyclohexylethyltrimethoxy silane. Use can be made of other organo silicon compounds in the form of a silane, silanol or polysiloxane in which the organic group attached to the silicon atom contains an epoxy group, such as glycydoxypropyltrimethoxy silane or 3,-4-epoxycyclohexylethyltrimethoxy silane. Instead of the organo silicon compounds, use can be made of a Werner complex compound in which the carboxylato group coordinated with the trivalent nuclear chromium atom contains an amino group or an epoxy group such as aminopropylato chromic chloride, glycine chromic complex, beta-alanine chromic complex, or glycylato chromic chloride.

A forming size composition embodying the further concepts of the present invention can be formulated as follows:

EXAMPLE 24

| | | |
|---|---|---|
| Resorcinol-formaldehyde resin | 2–10 | pts. by wt. |
| Formaldehyde (37% solution) | 1–3 | pts. by wt. |
| Concentrated ammonium hydroxide | 2–5 | pts. by wt. |
| Beta-aminovinyltrimethoxy silane-butadiene-styrene terpolymer | 15–50 | pts. by wt. |
| Neoprene rubber latex (50% solids) | 25–50 | pts. by wt. |
| Butadiene latex (60% solids) | 5–15 | pts. by wt. |
| Alkali metal hydroxide | .05–0.2 | pts. by wt. |
| Anchoring agent | 0.1–3.0 | pts. by wt. |

Water is added to form an aqueous dispersion having a solids content within the range of 2–10% by weight.

Application to the individual glass fibers should be made in an amount to deposit dry solids constituting 1–10% by weight of the sized glass fibers.

EXAMPLE 25

| | | |
|---|---|---|
| Amide terpolymer of Example 10 | 15 | parts by wt. |
| Beta-alanine chromic complex | 0–2 | parts by wt. |
| Water | 100 | parts by wt. |

EXAMPLE 26

| | | |
|---|---|---|
| Natural rubber latex-resorcinol-formaldehyde resin (38% solids - "Lotol") | 2–10 | parts by wt. |
| Silyl-containing terpolymer | 15–50 | parts by wt. |
| Anchoring agent | 0.1–3.0 | parts by wt. |

To the foregoing water is added to form an aqueous dispersion having a solids content within the range of 2–15% by weight. The resulting dispersion may be applied to individual glass fibers to deposit dry solids on the glass fibers constituting 1–10% by weight of the sized glass fibers.

EXAMPLE 27

| | | |
|---|---|---|
| Resorcinol-formaldehyde resin | 2.0 | pts. by wt. |
| Formaldehyde (37% solution) | 1.0 | pts. by wt. |
| Concentrated ammonium hydroxide | 2.7 | pts. by wt. |
| Monoamide-butadiene-styrene terpolymer (50% solids) | 25.0 | pts. by wt. |
| Neoprene rubber latex (50% solids) | 41.0 | pts. by wt. |
| Butadiene latex (60% solids) | 5.0 | pts. by wt. |
| Sodium hydroxide | 0.5 | pts. by wt. |
| Gamma-aminopropyltriethoxy silane | 1.0 | pts. by wt. |
| Water | 1100.0 | pts. by wt. |

In the size compositions of Examples 24–27, the anchoring agent can be employed in an amount within the range of 0.1–3% by weight of the size composition.

When the glass fibers are sized in forming with a composition embodying the features of this invention, the sized fibers can be processed directly into sized yarns, strands, cords or fabrics, or used alone in combination with elastomeric materials without the need for impregnation of the bundles of glass fibers since individual fibers of the bundle are already provided with a coating formulated to contain the desired components for anchoring the elastomeric material and for protecting the glass fibers to enhance their processing and performance characteristics.

In fabricating the combination of the glass fibers treated in accordance with the practice of this invention, with elastomeric materials, the glass fibers or bundles of glass fibers are mixed with elastomeric material or otherwise laid down in the desired arrangement for combination with the elastomeric material as in the manufacture of glass fiber reinforced belts or in the manufacture of rubber tires reinforced with cords of glass fibers. The combination of glass fibers and elastomeric material is processed in a conventional manner by molding or cure under heat and compression or by vulcanization for advancement of the elastomeric material to a cured or vulcanized stage while in combination with the treated glass fibers whereby the glass fibers or bundles of glass fibers become strongly integrated with the elastomeric material in the glass fiberelastomeric product.

It will be understood that the size compositions, represented by Examples 24 to 27, may also be employed as impregnating compositions, preferably with lesser dilution with aqueous medium, since the anchoring agent embodied in the size composition will continue to operate as an anchoring agent further to facilitate the bonding relationship or integration between the elastomeric material of the continuous phase and the treated glass fibers. It will be understood further that the glass fiber may be impregnated in forming with a size composition represented by Examples 24 to 27, followed by impregnation of strands, yarns, cords, fabrics or bundles formed thereof with compositions of this invention represented by Examples 5 to 23.

It will be apparent that I have provided a new and improved composition for use in the treatment of glass fibers and bundles of glass fibers to enhance their integration with elastomeric materials in the manufacture of glass fiber-elastomeric products.

It will be understood that invention exists not only in the composition for use in the treatment of the glass fibers to prepare the glass fibers for combination with elastomeric materials but that invention exists also in the process in which the compositions are employed in the treatment of glass fibers as well as the treated or impregnated glass fiber products formed thereof.

It will be understood that changes may be made in the details of formulation and methods of application or use without departing from the spirit of the invention, especially as defined in the following claims.

I claim:

1. Glass fibers having a thin coating thereon, said coating comprising a terpolymer formed by the interpolymerization of butadiene, styrene and an amino silane having the formula

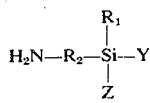

wherein Z is hydrogen or a readily hydrolyzable group, $R_1$ is alkenyl, $R_2$ is a divalent organic group selected from the group consisting of alkylene, arylene and cyclohexylene and Y is selected from the group consisting of $R_1$, $R_2$ and Z, or the corresponding silanols and siloxanes, with the terpolymer containing 60 to 80% by weight of butadiene, 5 to 40% by weight of styrene and 0.1 to 40% by weight of the amino silane.

2. Glass fibers as defined in claim 1 wherein said amino silane forms between 1 and 10% by weight of said terpolymer.

3. Glass fibers as defined in claim 1 wherein the coating includes an elastomer compatible material selected from the group consisting of an elastomer and a blend of an elastomer and a resorcinol-aldehyde resin.

4. Glass fibers as defined in claim 1 wherein the coating includes an anchoring agent.

5. Glass fibers as defined in claim 1 wherein the amino silane is gamma-aminopropylvinyldimethoxy silane.

6. A glass fiber bundle having an impregnant therein, said impregnant comprising a terpolymer formed by the interpolymerization of butadiene, styrene and an amino silane having the formula:

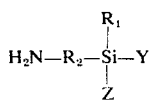

wherein Z is hydrogen or a readily hydrolyzable group, $R_1$ is alkenyl, $R_2$ is a divalent organic group selected from the group consisting of alkylene, arylene and cyclohexylene and Y is selected from the group consisting of $R_1$, $R_2$ and Z or the corresponding silanols and siloxanes, with the terpolymer containing 60 to 80% by weight of butadiene, 5 to 40% by weight of styrene and 0.1 to 40% by weight of the amino silane.

7. A glass fiber bundle as defined in claim 6 wherein said impregnant includes an elastomer compatible material selected from the group consisting of an elastomer and a blend of an elastomer with a resorcinol-aldehyde resin.

8. A glass fiber bundle as defined in claim 6 wherein said impregnant constitutes between 5–25% by weight of the glass fiber system.

9. A glass fiber bundle as defined in claim 6 wherein the individual glass fibers comprising the bundle have a thin size coating thereon.

10. A glass fiber bundle as defined in claim 6 wherein the amino silane is gamma-aminopropylvinyldimethoxy silane.

11. In a glass fiber reinforced elastomeric product wherein an elastomeric material constitutes a continuous phase in which the glass fibers are distributed, the improvement in the bonding relationship between the glass fibers and the elastomeric material comprising a coating of a terpolymer formed by the interpolymerization of butadiene, styrene and a silicon compound having the formula

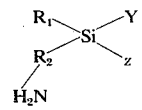

wherein Z is selected from the group consisting of hydrogen and a readily hydrolyzable group, $R_1$ is an alkenyl group, $R_2$ is a divalent organic group selected from the group consisting of alkylene, arylene and cyclohexylene and Y is selected from the group consisting of $R_1$, $R_2$ and Z, or the corresponding silanols and siloxanes, with the terpolymer containing 60 to 80% by weight butadiene, 5 to 40% by weight styrene and 0.1 to 40% by weight of the silicon compound.

12. An elastomeric product as defined in claim 11 wherein the glass fibers are in the form of a bundle and the coating constitutes an impregnant in the bundle.

13. An elastomeric product as defined in claim 12 wherein the glass fibers forming the bundle have a thin size coating on the surfaces thereof.

14. An elastomeric product as defined in claim 12 wherein the bundle is formed of strands of glass fibers plied and twisted together to form a cord.

15. An elastomeric product as defined in claim 11 wherein the silicon compound is gamma-aminopropylvinyldimethoxy silane.

* * * * *